(12) United States Patent
Velázquez López et al.

(10) Patent No.: US 7,987,081 B2
(45) Date of Patent: Jul. 26, 2011

(54) METHOD AND SYSTEM FOR A QUICK CALCULATION OF AERODYNAMIC FORCES ON AN AIRCRAFT

(75) Inventors: Angel Gerardo Velázquez López, Madrid (ES); José Manuel Vega De Prada, Madrid (ES); Luis Santiago Lorente Manzanares, Madrid (ES); Diego Alonso Fernández, Burgos (ES)

(73) Assignees: Airbus Espana, S.L., Madrid (ES); Universidad Politecnica de Madrid, Madrid (ES)

( * ) Notice: Subject to any disclaimer, the term of this patent is extended or adjusted under 35 U.S.C. 154(b) by 545 days.

(21) Appl. No.: 12/070,544

(22) Filed: Feb. 19, 2008

(65) Prior Publication Data

US 2009/0157364 A1   Jun. 18, 2009

(30) Foreign Application Priority Data

Dec. 18, 2007   (ES) .................................. 200703349

(51) Int. Cl.
    *G06F 9/455*   (2006.01)
(52) U.S. Cl. ............................................. 703/9; 73/147
(58) Field of Classification Search .................... 703/10, 703/9; 701/220, 14; 244/208, 87, 199, 12.6, 244/56, 76 R; 165/276; 315/111.61; 73/147; 416/228
    See application file for complete search history.

(56) References Cited

U.S. PATENT DOCUMENTS

| | | | | |
|---|---|---|---|---|
| 4,303,978 A * | 12/1981 | Shaw et al. | ................... | 701/220 |
| 4,598,888 A * | 7/1986 | Beteille | ....................... | 244/76 R |
| 5,927,948 A * | 7/1999 | Perry et al. | ..................... | 416/228 |
| 6,457,672 B1 * | 10/2002 | Tai | .................................. | 244/56 |
| 2004/0024500 A1 * | 2/2004 | Campbell | ....................... | 701/14 |
| 2005/0029396 A1 * | 2/2005 | Englar et al. | ................. | 244/12.6 |
| 2005/0184196 A1 * | 8/2005 | Shmilovich et al. | .......... | 244/199 |
| 2007/0095135 A1 * | 5/2007 | Rueger | ............................. | 73/147 |
| 2007/0102575 A1 * | 5/2007 | Morgan et al. | .................. | 244/87 |
| 2008/0116808 A1 * | 5/2008 | McClure et al. | ......... | 315/111.61 |
| 2008/0245520 A1 * | 10/2008 | Hyde et al. | ..................... | 165/276 |
| 2009/0084906 A1 * | 4/2009 | Hassan et al. | ................. | 244/208 |
| 2009/0095843 A1 * | 4/2009 | Powell | ...................... | 244/135 A |

OTHER PUBLICATIONS

Sadeghi et al., "Coupled fluid structure simulation for turbomachinery blade rows", AIAA, 2005.*
Lathauwer et al., "A multilinear singular value decomposition", SIAM journal of matrix analysis, 2000.*
Collis et al., "Issues in active flow control: Theory, control, simulation and experiment", 2004.*

(Continued)

*Primary Examiner* — Kandasamy Thangavelu
(74) *Attorney, Agent, or Firm* — Ladas & Parry LLP

(57) ABSTRACT

A computer-aided method suitable for assisting in the design of an aircraft by providing the dimensioning aerodynamic forces and other relevant values comprising the following steps: a) Selecting a set of parameters of the aircraft, being said aerodynamic forces and other relevant values dependant of said parameters; b) Performing flow field CFD RANS computations for a number N1 of different combination of values of said parameters; c) Obtaining said aerodynamic forces and other relevant values for whatever combination of values of said parameters through a reduced-order model, generated by computing the POD modes of the flow variables, expanding the flow variables using said POD modes and obtaining the POD coefficients of said expanded flow variables using a genetic algorithm that minimizes the error associated to the expansion of the Navier-Stokes equations. The invention also refers to a system for carrying out said method.

19 Claims, 2 Drawing Sheets

OTHER PUBLICATIONS

Li et al., "Optimizing thermal design of data center cabinets with a new multi-objective genetic algorithm", Distributed Parallel Databases, 2007.*

Muller et al., "Application of machine learning algorithms to flow modeling and optimization", Institute of flow dynamics, Switzerland, 1999.*

Rambo, J.D., "Reduced order modeling of multiscale turbulent convection: Application to data center thermal management", Georgia Institute of Technology, 2006.*

Koumoutsakos et al., "Algorithms for shear flow control and optimization", IEEE 1999.*

* cited by examiner

METHOD AND SYSTEM FOR A QUICK CALCULATION OF AERODYNAMIC FORCES ON AN AIRCRAFT

FIELD OF THE INVENTION

The present invention refers to methods and systems for assisting in the design of aircrafts by making analytical predictions of the aerodynamic forces experienced by the complete aircraft or an aircraft component when these forces are dependant of a significant number of parameters.

BACKGROUND OF THE INVENTION

A common situation in practical industrial applications related to product development is the need to perform quick surveys inside a space of state parameters. In mature and very competitive industrial sectors like aerospace, this need is motivated by the drive to generate products having good technical performance within design cycles that are as short as feasible. That is: time is a key factor in aerospace competitiveness because shortening the time market may provide a leading economic advantage during the product life cycle.

In the specific case of aeronautics, the prediction of the aerodynamic forces, and more generally skin surface values distributions, experienced by an aircraft is an important feature, in order to optimally design its structural components so that the weight of the structure is the minimum possible, but at the same time being able to withstand the expected aerodynamic forces.

Thanks to the increase of the use of the Computer Fluid Simulation Capability, nowadays, the determination of the aerodynamic forces on an aircraft is commonly done by solving numerically the Reynolds Averaged Navier-Stokes equations (RANS equations from now onwards) that model the movement of the flow around the aircraft, using discrete finite elements or finite volume models. With the demand of accuracy posed in the aeronautical industry, each one of these computations requires important computational resources.

The dimensioning aerodynamic forces are not known a priori, and since the global magnitude of the forces may depend on many different flight parameters, like angle of attack, angle of sideslip, Mach number, control surface deflection angle, it has been necessary to perform many lengthy and costly computations to properly predict the maximum aerodynamic forces experienced by the different aircraft components or the complete aircraft.

In order to reduce the overall number of these lengthy computations, approximate mathematical modelling techniques have been developed in the past, like Single Value Decomposition (SVD) as a means to perform intelligent interpolation, or the more accurate Proper Orthogonal Decomposition (POD from now onwards) that takes into account the physics of the problem by using a Galerkin projection of the Navier-Stokes equations.

The idea of these techniques is to define the new analytical solution as a combination of the information obtained before. POD defines several modes that include the solution obtained by Computational Fluid Dynamics (CFD) and then uses those modes to reproduce solutions not obtained by CFD. The more modes used the best with the limitation that the maximum number of modes is the number of snapshots.

But it is known in the art that these POD methods based in Galerkin equations, attractive as they are, need stabilisation schemes to yield acceptable solutions, but still with the risk that an erroneous state of the POD-reduced order model equations may be obtained after a long-time even if the correct state is set to initialise the simulation. This stability problem of the POD Galerkin projection based methods has prevented their usage from an industrial point of view.

The present invention is intended to solve this drawback.

SUMMARY OF THE INVENTION

It is an object of the present invention to provide methods and systems for making analytical predictions of the aerodynamic forces experienced by the complete aircraft or an aircraft component when these forces are dependant of a significant number of parameters.

It is another object of the present invention to provide methods and systems for allowing a quick calculation of the aerodynamic forces experienced by the complete aircraft or an aircraft component when these forces are dependant of a significant number of parameters.

In one aspect, these and other objects are met by a computer-aided method suitable for assisting in the design of an aircraft by providing the dimensioning aerodynamic forces, skin values or values distribution around the complete aircraft or an aircraft component, comprising the following steps:

Selecting a set of parameters of said complete aircraft or said aircraft component, being said aerodynamic forces, skin values or values distribution dependant of said parameters.

Performing flow field CFD RANS computations for a number N1 of different combination of values of said parameters.

Obtaining said aerodynamic forces, skin values or values distribution for whatever combination of values of said parameters through a reduced-order model, generated by computing the POD modes of the flow variables, expanding the flow variables using said POD modes and obtaining the POD coefficients of said expanded flow variables using a genetic algorithm that minimizes the error associated to the expansion of the Navier-Stokes equations.

In another aspect, these and other objects are met by a system for assisting in the design of an aircraft by providing the dimensioning aerodynamic forces, skin values or values distribution around the complete aircraft or an aircraft component which are dependant of a given set of parameters, that comprises:

A computer-implemented discrete model of said complete aircraft or said aircraft component and the surrounding fluid flow field.

A computer-implemented CFD RANS module for calculating and storing said aerodynamic forces, skin values or values distribution and discrete flow field values for a sample of cases having different combinations of values of said parameters.

A computer-implemented High Order Single Value Decomposition (HOSVD) module capable of determining the POD modes of the flow field.

A computer-implemented reduced order model module for performing quick calculations and storage of the flow field variable values, for whatever combination of values of said parameters, obtained by modelling the variables by means of an expanded series based on the flow field POD modes, having obtained the POD coefficients using a genetic algorithm that minimizes the error associated to implementing said expansion into the Navier-Stokes equations.

The above-mentioned method and system are applicable to the design of a classical aircraft or aircraft component formed by a cylindrical fuselage, wings in the centre fuselage either in the middle or high or low region of the fuselage, conventional tail or T-tail or Cruciform-tail or V-tail or H-tail or U-tail or canard and engines in the wing or at the rear fuselage and also to the design of a non-classical aircraft configuration like a blended wing body (BWB) or a flying wing.

Said set of parameters can be, in particular, any combination of the following (if applicable to the aircraft or aircraft component being designed): the angle of attack, the sideslip angle, the Mach number, the wing aileron deflection angle, spoilers deflection, high lift devices deflection, canard deflection, landing gear deflected status, landing gear doors angle, APU inlet open angle, the vertical tailplane rudder deflection angle, the horizontal tailplane elevator deflection angle and the horizontal tailplane setting angle. The range of validity of said parameters is that of the aircraft typical flight envelope.

Said aerodynamic forces include in particular the lift force, the drag force, the lateral force, the pitching moment, the rolling moment and the yawing moment of the aircraft or aircraft component being designed.

Said skin values at the surface include in particular the static pressure, the skin friction, the skin temperature and whatever combination of them. Said values distribution could be, in particular, total force per section (could be a cut, line, surface that form all the object), heat transfer, total friction and generally whatever integral of the skin values or their combination.

The method explained here can be used also to reduce storage information needed for aircraft design, storing only the obtained modes in order to reduce computation storage demands.

Other characteristics and advantages of the present invention will be clear from the following detailed description of embodiments illustrative of its object in relation to the attached figures.

DETAILED DESCRIPTION OF THE INVENTION

Figures 1, 2:
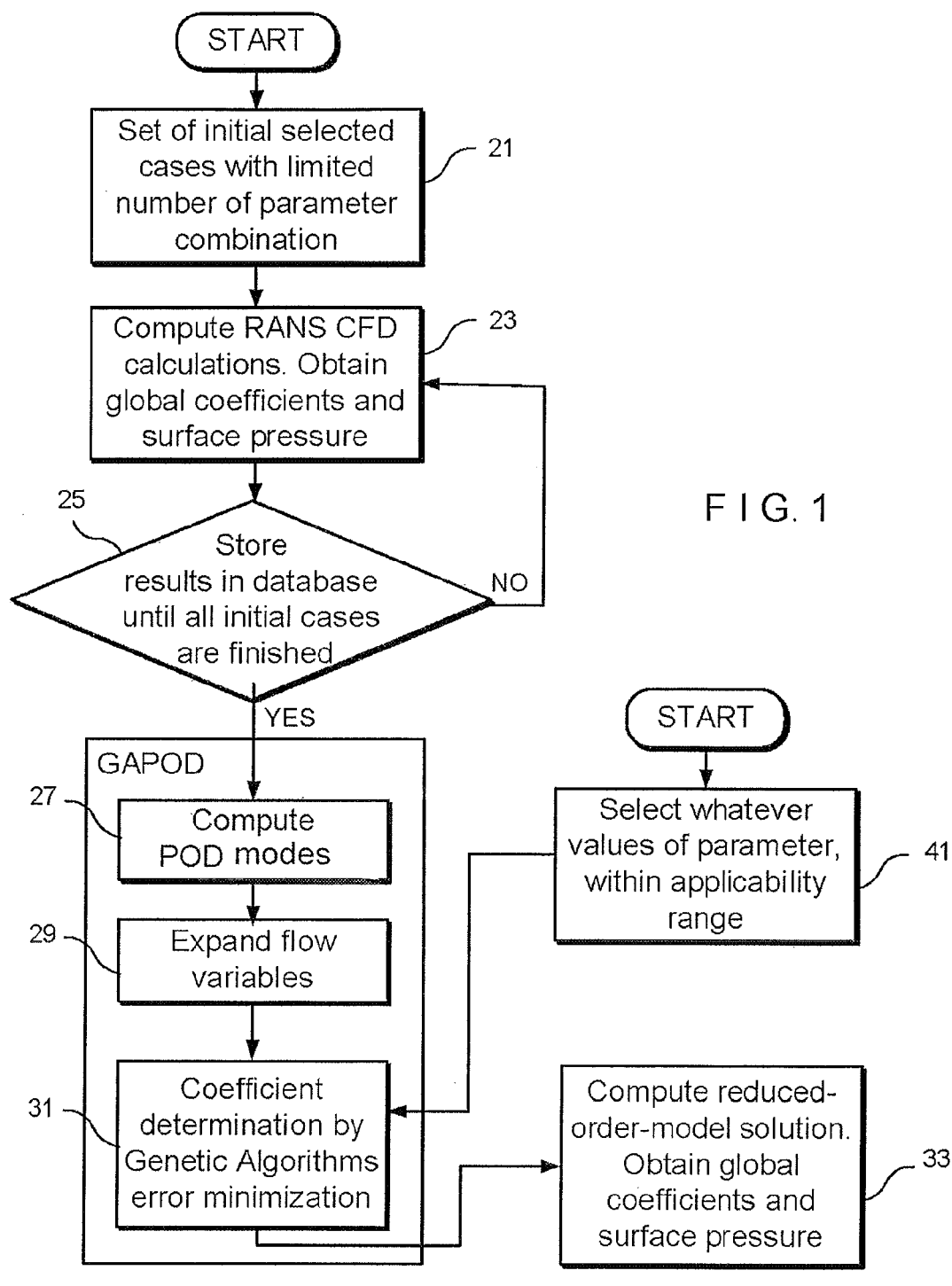
FIG. 1 shows a block diagram of a method according to the present invention.
FIG. 2 shows schematically an airfoil, which can be the subject of a method according to the present invention and some of its relevant parameters.

An embodiment of a method and system according to the present invention will now be described following FIG. 1 for calculating the aerodynamic forces in an airfoil 11 moving through the air depending of the following parameters:

The angle of attack $\alpha$, ranging between $-3°$ and $3°$.

The Mach number M (airspeed divided by the sound speed), ranging between 0.4 and 0.8.

The elevator deflection angle $\delta$, ranging between $-5°$ and $5°$.

In step 21 a number N1 of initial cases (snapshots) having different combinations of values of the parameters $\alpha$, $\delta$ and M is selected. Three examples of initial cases follow. The end user can select the number of initial cases. The user must take care that the initial cases will cover all the main physical features of the movement of the aircraft or aircraft component (an airfoil in this case) through the fluid.

EXAMPLE 1

1053 Cases Combining the Following Parameter Values $\alpha$ (13 values): $-3.00, -2.50, -2.00, -1.50, -1.00, -0.50, 0.00, +0.50, +1.00, +1.50, +2.00, +2.50, +3.00$
M (9 values): 0.40, 0.45, 0.50, 0.55, 0.60, 0.65, 0.70, 0.75, 0.80
$\delta$ (9 values): $-5.00, -3.00, -2.00, -1.00, 0.00, +1.00, +2.00, +3.00, +5.00$

EXAMPLE 2

378 Cases Combining the Following Parameter Values $\alpha$ (9 values): $-3.00, -2.50, -1.50, -1.00, 0.00, +1.00, +1.50, +2.50, +3.00$
M (6 values): 0.40, 0.55, 0.65, 0.70, 0.75, 0.80
$\delta$ (7 values): $-5.00, -3.00, -2.00, 0.00, +2.00, +3.00, +5.00$

EXAMPLE 3

100 Cases Combining the Following Parameter Values $\alpha$ (5 values): $-3.00, -1.50, 0.00, +1.50, +3.00$
M (4 values): 0.40, 0.55, 0.70, 0.80
$\delta$ (5 values): $-5.00, -3.00, 0.00, +3.00, +5.00$ In step 23, the lift coefficient 13, the drag coefficient 15, the pitching moment coefficient 17 and the surface pressure on the airfoil 11, for each selected case, are calculated by a Computational Fluid Dynamic software program (CFD RANS).

Figure 3:
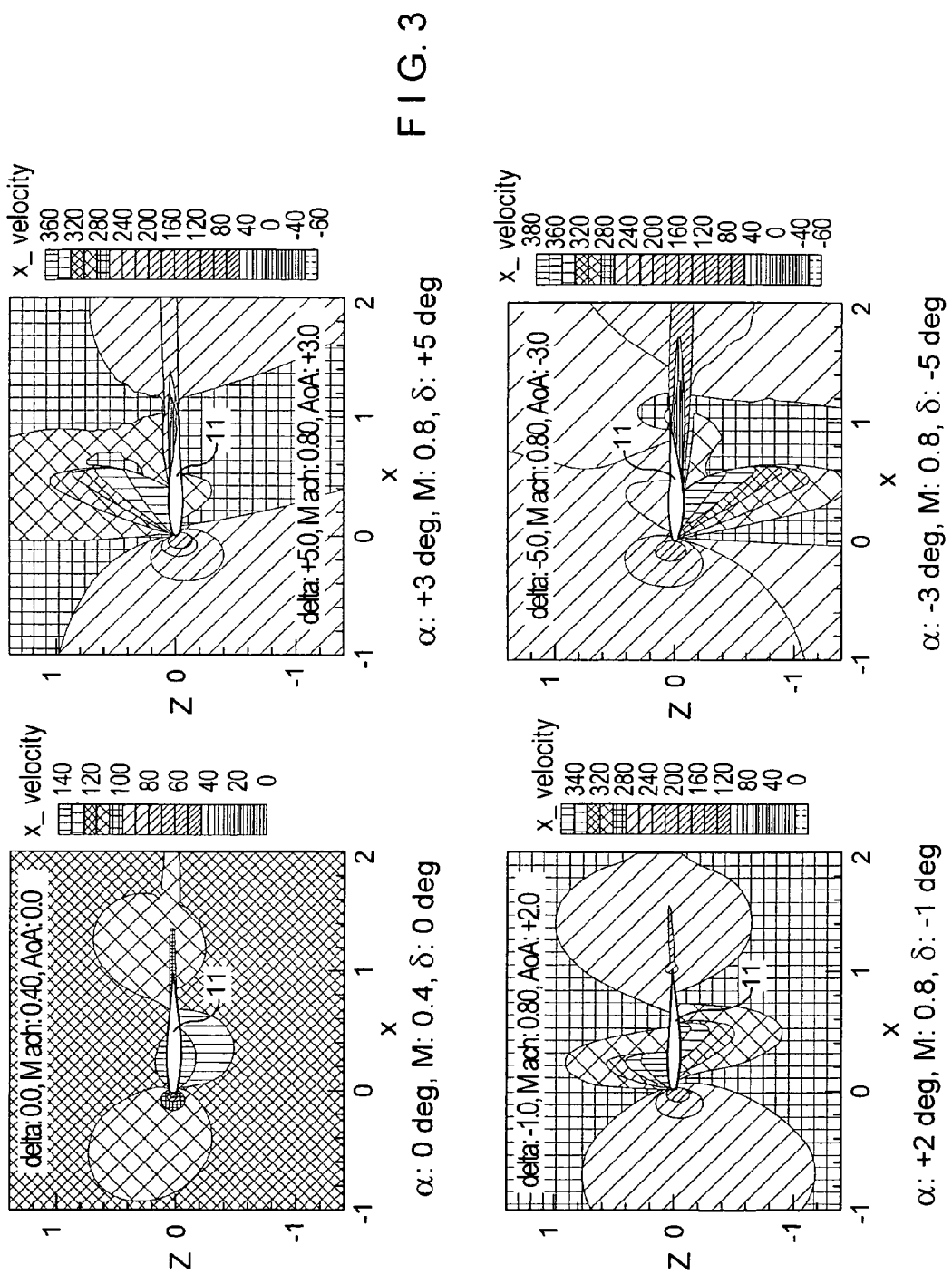
FIG. 3 shows a graphic representation of the results of the calculation of a flow variable around the airfoil in four initial cases.

As it can be seen in FIG. 3 there are big differences in the flow field nature in the four cases shown with different values of the parameters $\alpha$, $\delta$ and M that impose very different aerodynamic forces in the airfoil 11.

In step 25 the results of said calculation are stored in a database, not only global force coefficients and pressure distribution but also the whole flow field solution, for the different variables at the discrete mesh points.

In step 27, using said results, the POD modes of the flow variables: U (velocity in the x-direction), W (velocity in the z-direction), T (static air temperature) and $\rho$ (air density) are computed by making a first Higher Order Single Value Decomposition (HOSVD) of the solutions that takes into account a correction for the existence of possible shock waves in the flow field. This correction is managed in three consecutive sub-steps: a) identifying shock wave structures (position and jump intensity) and disassembling of the structure into a steep jump and a smooth profile; b) application of the HOSVD to the two parts of the structure, and c) interpolating and assembling of the separated parts so as to reconstruct the complete shock wave structure.

Additionally, in order to help in the resolution of the POD equations, two more variables are considered: the density fluxes in both the X-direction and Z-direction. As the airfoil considered in this embodiment is a 2-dimensional airfoil, the POD modes for x-velocity $U_i(x,z)$, z-velocity $W_i(ox)$, temperature $T_i(x,z)$, density $\Re(x,z)$, density flux along x $X_i(x,z)$ and density flux along y $Z_i(x,z)$ are spatial 2D modes.

In step 29 the flow variables are expanded assuming a set of basic functions based in the corresponding POD modes calculated in step 27. The number of modes necessary to describe each variable may be different depending on the degree of changes of the variable values with the number of parameters: the less the variable changes its value around the airfoil the less number of modes that are necessary for the expansion of this specific variable. The necessary number of modes for each variable is calculated also in step 29. The way to do this is that the user specifies a requested error margin. Then, it is automatically selected, for each variable, the minimum number of modes needed to satisfy that an analytical error definition, based on the eigenvalues of the so called covariance matrix formed by the weighting coefficients of each mode serial definition, is less than the requested error margin. This method to determine the error is based in the Frobenius normalisation.

The decomposition in modes, for the specific 2D airfoil embodiment, is the following:

$$u(x, z) = \sum_{i=1}^{N_{m,1}} a_i U_i(x, z)$$

$$T(x, z) = \sum_{i=1}^{N_{m,4}} d_i T_i(x, z)$$

$$w(x, z) = \sum_{i=1}^{N_{m,2}} b_i W_i(x, z)$$

$$C_x(x, z) = \sum_{i=1}^{N_{m,5}} e_i X_i(x, z)$$

$$\rho(x, z) = \sum_{i=1}^{N_{m,3}} c_i R_i(x, z)$$

$$C_z(x, z) = \sum_{i=1}^{N_{m,6}} f_i Z_i(x, z)$$

Where u is the x-velocity (using x-velocity $U_i$ modes for reconstruction), w is the z-velocity (using z-velocity $W_i$ modes for reconstruction), $\rho$ is the density (using density $R_i$ modes for reconstruction), T is the temperature (using temperature $T_i$ modes for reconstruction), $C_x$ and $C_z$ are density fluxes along x and z (using density fluxes $X_i$ and $Z_i$ modes for reconstruction) The coefficients $a_i$, $b_i$, $c_i$, $d_i$, $e_i$ and $f_i$ are unknowns to be determined.

In step 31, for whatever case 41 with a particular combination of parameters $\alpha$, $\delta$ and M to be computed, coefficients $a_i$, $b_i$, $c_i$, $d_i$, $e_i$ and $f_i$ are obtained by minimising the global error associated to implement the expansions into the governing Navier-Stokes equations and boundary conditions that describes the movement of the flow around the airfoil.

The Navier-Stokes equations that describes the movement of the flow around of the 2D airfoil under consideration are the following (where $\gamma$ is the heat capacity ratio):

$$\nabla \cdot c = 0$$

$$c \nabla v + \frac{1}{\gamma}(\rho \nabla T + T \nabla \rho) = 0$$

$$c \cdot \nabla T + (\gamma - 1) T \nabla \cdot v$$

$$c = \rho v$$

The Boundary conditions are the following (where the suffix $\infty$ means inflow conditions and AoA is the angle of attack):

$$u_\infty^2 + w_\infty^2 = M^2$$

$$w_\infty = \tan(AoA) u_\infty$$

$$\rho_\infty = 1$$

$$T_\infty = 1$$

In this case the speed is non-dimensionalised by the speed of the sound.

The Fitness Function, whose minimum must be found, is obtained by replacing the expanded variables from step 29 into the Navier-Stokes equations that describes the movement of the flow around of the 2D airfoil under consideration, and then forcing that the sum of all the square values of each equation's left part, integrated over the fluid domain and added to the squares of the boundary condition, will be minimum (ideally it should be zero).

The resulting Fitness Function F evaluation is the following (where $\Omega$ means all the interest domain volume, x, and z are the coordinate system directions and $\delta\Omega$ are the boundaries of the domain):

$$F = \int_\Omega \left(\frac{\partial c_x}{\partial x} + \frac{\partial c_z}{\partial z}\right)^2 ++ \int_\Omega \left(c_x \frac{\partial u}{\partial x} + c_z \frac{\partial u}{\partial z} + \frac{1}{\gamma}\rho\frac{\partial T}{\partial x} + \frac{1}{\gamma}T\frac{\partial \rho}{\partial x}\right)^2 ++$$

$$\int_\Omega \left(c_x \frac{\partial \omega}{\partial x} + c_z \frac{\partial \omega}{\partial z} + \frac{1}{\gamma}\rho\frac{\partial T}{\partial z} + \frac{1}{\gamma}T\frac{\partial \rho}{\partial z}\right)^2 ++$$

$$\int_\Omega \left(u\frac{\partial T}{\partial x} + \omega\frac{\partial T}{\partial z} + (\gamma - 1)T\left(\frac{\partial u}{\partial x} + \frac{\partial \omega}{\partial z}\right)\right)^2 ++$$

$$\int_\Omega (c_x - \rho u)^2 ++ \int_\Omega (c_z - \rho \omega)^2 ++$$

$$\left(\frac{1}{L_{in}^2}\int_{\delta\Omega_{in}} u \int_{\delta\Omega_{in}} u + \frac{1}{L_{in}^2}\int_{\delta\Omega_{in}} \omega \int_{\delta\Omega_{in}} \omega - M^2\right)^2 ++$$

$$\left(\int_{\delta\Omega_{in}} \omega - \tan(AoA)\int_{\delta\Omega_{in}} u\right)^2 ++$$

$$\left(1 - \frac{1}{L_{in}}\int_{\delta\Omega_{in}} \rho\right)^2 ++ \left(1 - \frac{1}{L_{in}}\int_{\delta\Omega_{in}} T\right)^2$$

It can be already seen in the expression of the Fitness Function that we are using directly the values of Cx and Cz, in order to keep the non-linearity of the problem as quadratic instead of cubic.

An example of how one term of the fitness function looks like, and how it depends on the coefficients $a_i$, $b_i$, $c_i$, $d_i$, $e_i$ and $f_i$ after we have implemented the expansion, is the following:

$$\int_\Omega \left(c_z \frac{\partial w}{\partial x} + c_z \frac{\partial w}{\partial z} + \frac{1}{\gamma}\rho\frac{\partial T}{\partial z} + \frac{1}{\gamma}T\frac{\partial \rho}{\partial z}\right)^2 =$$

$$\left(\int_\Omega \frac{\partial W_i}{\partial x}\frac{\partial W_j}{\partial x} X_k X_l\right) b_i b_j e_k e_l ++ 2\left(\int_\Omega \frac{\partial W_i}{\partial x}\frac{\partial W_j}{\partial z} X_k Z_l\right) b_i b_j e_k f_l ++ \frac{2}{\gamma}$$

$$\left(\int_\Omega \frac{\partial W_i}{\partial x}\frac{\partial R_j}{\partial z} T_k X_l\right) b_i c_j d_k e_l ++ \frac{2}{\gamma}\left(\int_\Omega \frac{\partial W_i}{\partial x} R_j \frac{\partial T_k}{\partial z} X_l\right) b_i c_j d_k e_l ++$$

$$\left(\int_\Omega \frac{\partial W_i}{\partial z}\frac{\partial W_j}{\partial z} Z_k Z_l\right) b_i b_j f_k f_l ++ \frac{2}{\gamma}\left(\int_\Omega \frac{\partial W_i}{\partial z}\frac{\partial R_j}{\partial z} T_k Z_l\right) b_i c_j d_k f_l ++$$

$$\frac{2}{\gamma}\left(\int_\Omega \frac{\partial W_i}{\partial z} R_j \frac{\partial T_k}{\partial z} Z_l\right) c_i c_j d_k f_l ++ \frac{1}{\gamma^2}\left(\int_\Omega R_i R_j \frac{\partial T_k}{\partial z}\frac{\partial T_l}{\partial z}\right) c_i c_j d_k d_l ++$$

$$\frac{2}{\gamma^2}\left(\int_\Omega R_i \frac{\partial R_j}{\partial z} T_k \frac{\partial T_l}{\partial z}\right) c_i c_j d_k f_l ++ \frac{1}{\gamma^2}\left(\int_\Omega \frac{\partial R_i}{\partial z}\frac{\partial R_j}{\partial z} T_k T_l\right) c_i c_j d_k d_l$$

The minimisation of the fitness function is done using a Genetic Algorithm (GA) method, that finds out, for the specific case of parameter combination considered in step 41, the combination of the values of the coefficients $a_i$, $b_i$, $c_i$, $d_i$, $e_i$ and $f_i$ that minimise the value of the Fitness Function. In principle, it may appear that this approach is very slow to converge. However, it must taken into account the fact that a good approximation to the solution already exists because the global POD modes are available from step 27. Then, a standard spline interpolation between parameters using the previous HOSVD technique is used to have a first estimate of the solution. Then, this estimate is used as a seed within the initial population of the GA. In this way, we have GA convergence times that are, typically, of the order of 2% to 5% of the time required to converge a full CFD RANS calculation.

In step 33, a calculation of the global aerodynamic force coefficients and surface pressure along the airfoil 11 for the selected case 41 is performed using the reduced-order Genetic-Algorithm based POD model obtained in previous steps 27, 29 and 31 (hereinafter GAPOD). For doing this one uses coefficients $a_i$, $b_i$, $c_i$, $d_i$, $e_i$ and $f_i$ obtained from step 31 and applies it to the expansion in step 29 generating a flow field that one later can work on it.

Table 2 shows the results obtained for the Lift Coefficient $C_L$ and Pitching Moment coefficient Cm for two angles of attack, at a Mach number of 0.4 using a classical CFD RANS method and using the GAPOD method according to present invention, for a different number of initial cases (snapshots). The key for the different cases, according to the number of snapshots, is indicated in Table 1. The first column of Table 1 is the case number. The second column is the angle of attack used for the calculation, for both CFD RANS based method or GAPOD method. The third column shows which snapshots (from the original N1 parameter combination cases) are used for each case.

TABLE 1

| Case | α (CFD) | Snapshots used α (GAPOD) | | | | | | | |
|---|---|---|---|---|---|---|---|---|---|
| 1 | 1.5  | -3 |    | -1 |   | +1 |    | +3 |
| 2 | -1.5 | -3 |    | -1 |   | +1 |    | +3 |
| 3 | 1.5  | -3 |    | -1 | 0 |    |    | +3 |
| 4 | -1.5 | -3 |    | -1 | 0 |    |    | +3 |
| 5 | 1.5  | -3 | -2 | -1 | 0 | +1 | +2 | +3 |
| 6 | -1.5 | -3 | -2 | -1 | 0 | +1 | +2 | +3 |

TABLE 2

| | CFD | GAPOD | | |
|---|---|---|---|---|
| | α = 1.5° | Case 1 | Case 3 | Case 5 |
| $C_L$ | 0.0938 | 0.0946 | 0.0944 | 0.0934 |
| $C_M$ | 0.0189 | 0.0188 | 0.0189 | 0.0189 |
| | CFD | GAPOD | | |
| | α = -1.5° | Case 2 | Case 4 | Case 6 |
| $C_L$ | -0.2840 | -0.2824 | -0.2831 | -0.2836 |
| $C_M$ | 0.0199 | 0.0197 | 0.0197 | 0.0198 |

Table 2 shows that considering a greater number N1 of initial cases (snapshots) increases the accuracy of the method.

This table also shows that the results obtained with the method according to the present invention are accurate enough, even for the lowest number of initial cases.

The main advantage of the method is that the results are obtained in less than one tenth of the time needed using a classical CFD RANS method.

The application of the method in the design of an aircraft can be summarized as follows. The aircraft is designed at the edges of the envelope of the flight (defined by Mach number and altitude) and at the design point (some components can be designed out of the envelope as high critical cases), one obtains several selected points following step 21 and computes them in CFD as in step 23 storing them (step 25) until everything is finished. Once enough computations have been performed, a POD according to the method in step 27 is done. The reconstructed solutions are defined as in step 29 for each computation requested as critical case for global aircraft design as in steps 41, 33, obtaining the coefficients as in step 31.

Once all the CFD RANS computations are performed and no more extra computations are necessary, one can free the storing space of step 25 and store them as in step 27 via HOSVD modes.

Modifications may be introduced into the preferred embodiment just set forth, which are comprised within the scope defined by the following claims.

The invention claimed is:

1. A computer-aided method for assisting in a design of an aircraft by providing aerodynamic forces, skin values or values distribution around a complete aircraft or an aircraft component, comprising:
    a) selecting a set of parameters of said complete aircraft or said aircraft component, for computing said aerodynamic forces, skin values or values distribution dependant of said parameters;
    b) performing flow field Computational Fluid Dynamic Reynolds Averaged Navier-Stokes (CFD RANS) computations and calculating and storing said aerodynamic forces, skin values or values distribution for different combinations of values of a limited set of parameters;
    c) computing Proper Orthogonal Decomposition (POD) modes of flow variables;
    d) expanding the flow variables using said POD modes;
    e) obtaining POD coefficients of said expanded flow variables using a genetic algorithm that minimizes an error associated with expansion of Navier-Stokes equations;
    f) generating a reduced-order model using the POD modes and the POD coefficients; and
    g) obtaining said aerodynamic forces, skin values or values distribution for different combinations of values of the selected set of parameters through reduced-order model.

2. The computer-aided method according to claim 1, wherein said limited set of parameters includes at least an angle of attack.

3. The computer-aided method according to claim 2, wherein said limited set of parameters includes at least a Mach number.

4. The computer-aided method according to claim 3, further comprising:
    obtaining said POD modes of flow variables using a Higher Order Single Value Decomposition (HOSVD) technique;
    reproducing shock waves present in the flow field using the POD modes;
    modifying the POD modes to provide a correction for existence of shock waves in the flow field.

5. The computer-aided method according to claim 2, further comprising:
obtaining said POD modes of flow variables using a Higher Order Single Value Decomposition (HOSVD) technique;
reproducing shock waves present in the flow field using the POD modes;
modifying the POD modes to provide a correction for existence of shock waves in the flow field.

6. The computer-aided method according to claim 1, wherein said limited set of parameters includes at least a Mach number.

7. The computer-aided method according to claim 6, further comprising:
obtaining said POD modes of flow variables using a Higher Order Single Value Decomposition (HOSVD) technique;
reproducing shock waves present in the flow field using the POD modes;
modifying the POD modes to provide a correction for existence of shock waves in the flow field.

8. The computer-aided method according to claim 1, further comprising:
obtaining said POD modes of flow variables using a Higher Order Single Value Decomposition (HOSVD) technique;
reproducing shock waves present in the flow field using the POD modes;
modifying the POD modes to provide a correction for existence of shock waves in the flow field.

9. The computer-aided method according to claim 1, wherein the selected set of parameters comprise one or more of angle of attack, sideslip angle, Mach number, wing aileron deflection angle, spoilers deflection, high lift devices deflection, canard deflection, landing gear deflected status, landing gear doors angle, vertical tailplane rudder deflection angle, horizontal tailplane elevator deflection angle and horizontal tailplane setting angle.

10. The computer-aided method according to claim 1, wherein the aerodynamic forces comprise one or more of lift force, drag force, lateral force, pitching moment, rolling moment and yawing moment of the aircraft or aircraft component being designed.

11. The computer-aided method according to claim 1, wherein the skin values at surface include one or more of static pressure, skin friction and skin temperature.

12. The computer-aided method according to claim 1, wherein the values distribution include one or more of total force per section, heat transfer, total friction and integrals of the skin values.

13. The computer-aided method according to claim 1, wherein the flow variables include one or more of velocity in x direction, velocity in z direction, static air temperature, and air density.

14. A computing system for assisting in a design of an aircraft by providing aerodynamic forces, skin values or values distribution around a complete aircraft or an aircraft component, comprising:
one or more processors; and
a memory storing a computer-implemented discrete model of said complete aircraft or said aircraft component and the surrounding fluid flow field;
the memory further comprising instructions for:
a) selecting a set of parameters of said complete aircraft or said aircraft component, for computing said aerodynamic forces, skin values or values distribution dependant of said parameters;
b) performing flow field Computational Fluid Dynamic Reynolds Averaged Navier-Stokes (CFD RANS) computations and calculating and storing said aerodynamic forces, skin values or values distribution for a limited set of different combinations of values of said parameters;
c) computing Proper Orthogonal Decomposition (POD) modes of flow variables;
d) expanding the flow variables using said POD modes;
e) obtaining POD coefficients of said expanded flow variables using a genetic algorithm that minimizes an error associated with expansion of Navier-Stokes equations;
f) generating a reduced-order model using the POD modes and the POD coefficients; and
g) obtaining said aerodynamic forces, skin values or values distribution for different combinations of values of the selected set of parameters through reduced-order model;
wherein computing Proper Orthogonal Decomposition (POD) modes of flow variables further comprises:
obtaining said POD modes of flow variables using a Higher Order Single Value Decomposition (HOSVD) technique;
reproducing shock waves present in the flow field using the POD modes;
modifying the POD modes to provide a correction for existence of shock waves in the flow field.

15. The computing system according to claim 14, wherein the selected set of parameters comprise one or more of angle of attack, sideslip angle, Mach number, wing aileron deflection angle, spoilers deflection, high lift devices deflection, canard deflection, landing gear deflected status, landing gear doors angle, vertical tailplane rudder deflection angle, horizontal tailplane elevator deflection angle and horizontal tailplane setting angle.

16. The computing system according to claim 14, wherein the aerodynamic forces comprise one or more of lift force, drag force, lateral force, pitching moment, rolling moment and yawing moment of the aircraft or aircraft component being designed.

17. The computing system according to claim 14, wherein the skin values at surface include one or more of static pressure, skin friction and skin temperature.

18. The computing system according to claim 14, wherein the values distribution include one or more of total force per section, heat transfer, total friction and integrals of the skin values.

19. The computing system according to claim 14, wherein the flow variables include one or more of velocity in x direction, velocity in z direction, static air temperature, and air density.

* * * * *